US006767634B2

(12) United States Patent
Krishnaswamy

(10) Patent No.: US 6,767,634 B2
(45) Date of Patent: Jul. 27, 2004

(54) FIBRILLATED BAST FIBERS AS REINFORCEMENT FOR POLYMERIC COMPOSITES

(76) Inventor: Prabhat Krishnaswamy, c/o Engineering Mechanics Corporation of Columbus, 3518 Riverside Dr., Suite 202, Columbus, OH (US) 43221-1735

( * ) Notice: Subject to any disclaimer, the term of this patent is extended or adjusted under 35 U.S.C. 154(b) by 147 days.

(21) Appl. No.: 10/117,154

(22) Filed: Apr. 5, 2002

(65) Prior Publication Data

US 2003/0065059 A1 Apr. 3, 2003

Related U.S. Application Data

(60) Provisional application No. 60/281,964, filed on Apr. 6, 2001.

(51) Int. Cl.[7] ................................................. D01F 6/00
(52) U.S. Cl. ...................... 428/364; 428/362; 428/369; 428/401
(58) Field of Search ................................ 428/364, 362, 428/369, 401, 376

(56) References Cited

U.S. PATENT DOCUMENTS

| 5,232,779 | A |   | 8/1993 | Spehner |
| 5,494,748 | A |   | 2/1996 | Spehner |
| 5,720,083 | A |   | 2/1998 | Leduc et al. |
| 6,079,647 | A |   | 6/2000 | Leduc et al. |
| 6,114,348 | A |   | 9/2000 | Kolla et al. |
| 6,114,416 | A | * | 9/2000 | Kolla et al. ................... 524/9 |
| 6,133,348 | A |   | 10/2000 | Kolla et al. |
| 6,391,456 | B1 | * | 5/2002 | Krishnaswamy et al. 428/411.1 |
| 6,497,956 | B1 | * | 12/2002 | Phillips et al. .............. 428/376 |
| 6,565,348 | B1 | * | 5/2003 | Snijder et al. .............. 425/209 |

OTHER PUBLICATIONS

US 5,969,010, 10/1999, Kolla et al. (withdrawn)
English, Brent, "Wood–Plastic Materials and Processes: A look at Twenty Five Years of Patent Activity," English Engineering and Consulting, Dec. 5, 2000, pp 59–72.
Robson, David and Hague, Jamie, "A Comparison of Wood and Plant Fiber Properties," Forest Products Society, May 1995, pp. 41–46.
Snell, Rebecca, Hague, Jamie and Groom, Lesliem "Characterizing Agrofibers for Use in Composite Materials," Forest Products Society, May 1997, pp. 5–11.
Davies, Gary C. and Bruce, David M., "Effect of Environmental Relative Humidity and Damage on the Tensile Properties of Flax and Nettle Fibers," Forest Products Society, May 1997, pp. 12–18.

(List continued on next page.)

Primary Examiner—N. Edwards
(74) Attorney, Agent, or Firm—Randall J. Knuth

(57) ABSTRACT

A decorticated bast fiber such as from flax that is particularly suitable as a reinforcement for polymeric resins, thermoplastic, and thermoset composites. The invention specifically overcomes past difficulties involving compounding and injection molding of composite specimens with bast fiber reinforcements. In one form, ultrasonic energy is applied to decorticated bast fibers to cause fibrillation.

2 Claims, 11 Drawing Sheets

OTHER PUBLICATIONS

Gassan, Jochen and Bledzki, Andrzej K., "Dynamic–Mechanical Properties of Natural Fiber–Reinforced Plastics: The Effect of Coupling Agents," Forest Products Society, May 1997, pp. 76–80.

Snijder, Martin H.B., Wissing, Elmo and Modder, Johan F., "Polyolefins and Engineering Plastics Reinforced with Annual Plant Fibers," Forest Products Society, May 1997, pp. 181–191.

Kessler, R. W., Becker, U., Kohler, R. and Goth, B., "Steam Explosion of Flax—A Superior Technique for Upgrading Fibre Value," Biomass and Bioenergy, vol. 14. No. 3, pp. 237–248, 1998.

Sotton, Michel and Ferrari, Marc, "Adjustment of the Steam Explosion Treatment to Extract Fibers From Plants, Usable for Textile and Related End–Uses," Gordon and Breach Science Publishers, pp. 219–231, 1991.

Kessler, R. W., Wurster, J., Dinkel, U. and Tubach, M., "Cottonized Fibers From Non–Retted Flax by Steam Explosion Treatment," Gordon and Breach Science Publishers, pp. 233–242 and pp. 244–247, 1991.

Anderson, Donald B., "A Micromechanical Study of the Structure and Development of Flax Fibers," American Journal of Botany, XIV: 197–211, Apr., 1927.

Kessler, R.W., Kohler, R. and Tubach, M., "Novelties in Fibre Processing and Applications esp. Flax and Hemp," Institute Fur Angewandte Forschung, pp 1–17.

* cited by examiner

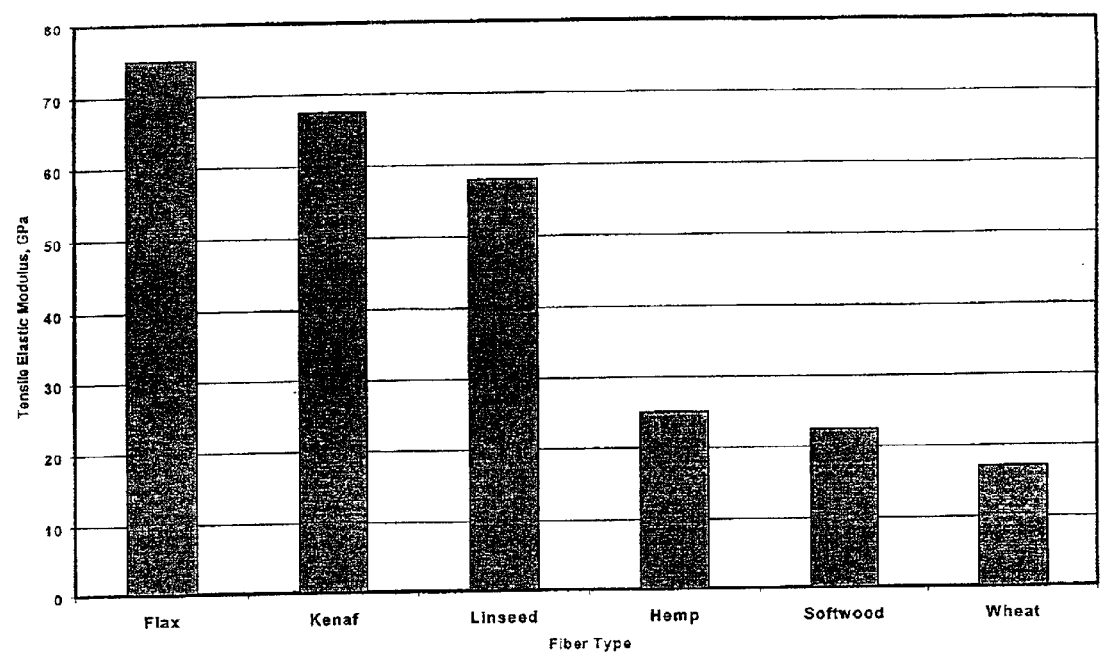
Figure 1 – Stiffness of various natural fibers showing flax fiber to be the strongest

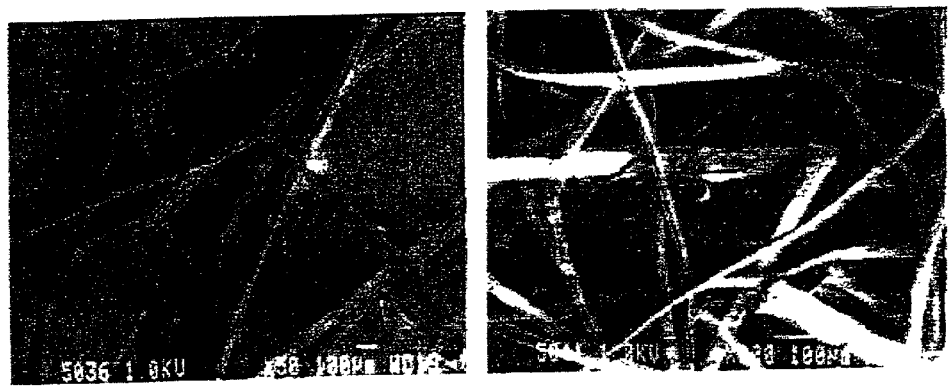
Figure 2 Scanning Electron Micrograph of (a) decorticated flax fiber (magnification = 50X) and (b) FIBEX™ (magnification = 200X)

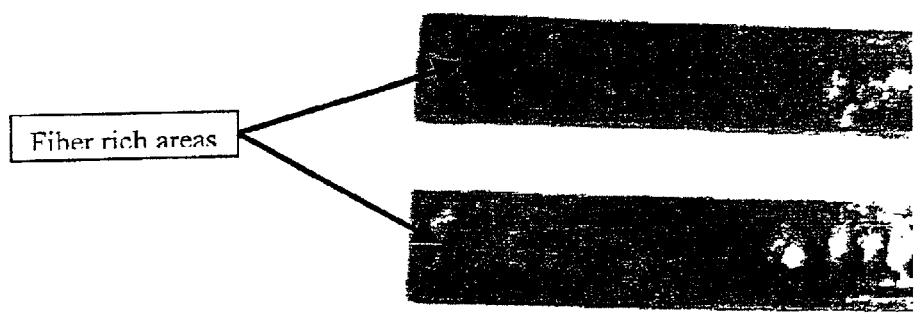
Figure 3 – Typical surface of molded specimen with DECORTICATED fiber showing 'clumping' or 'balling-up' of fiber during compounding and molding

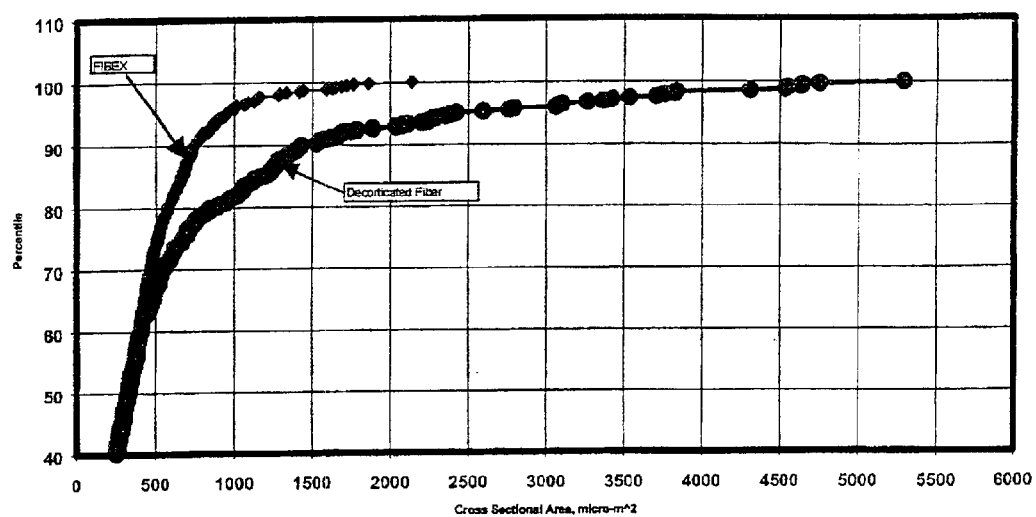
Figure 4a – Typical cross sectional area comparison of decorticated fiber and FIBEX™ showing extent of fibrillation

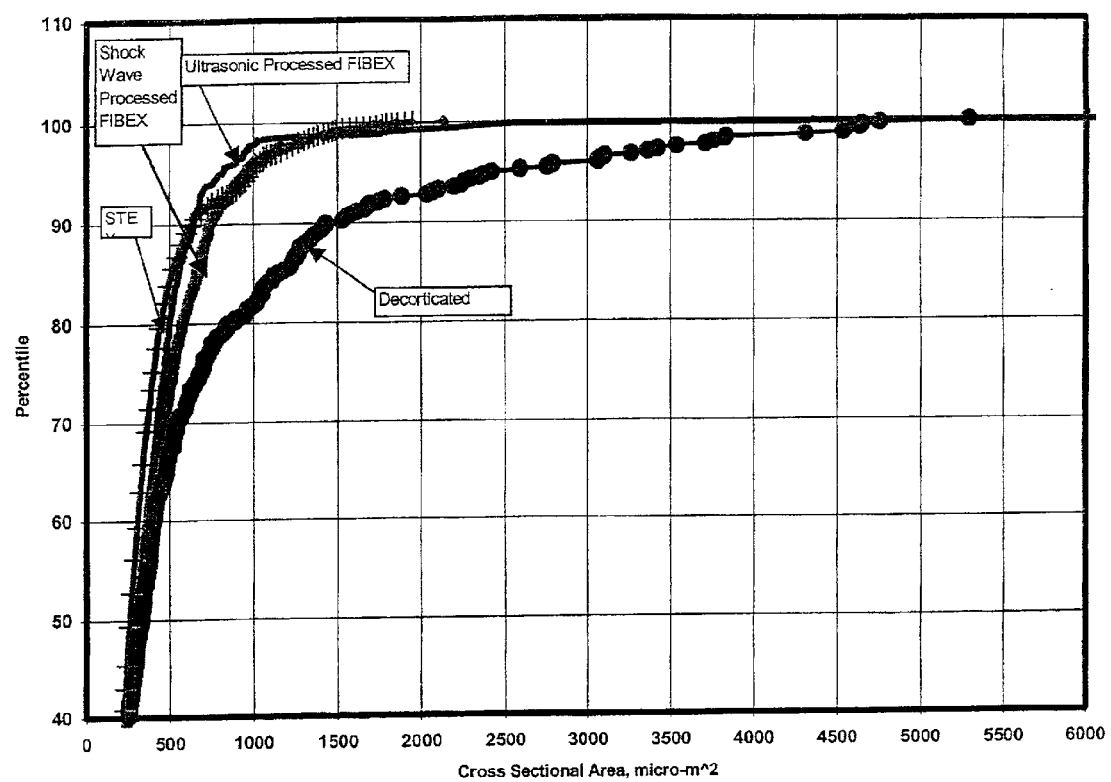
Figure 4b Comparison of Cross Sectional Area of FIBEX versus Decorticated Flax
Showing Extent of Fibrillation

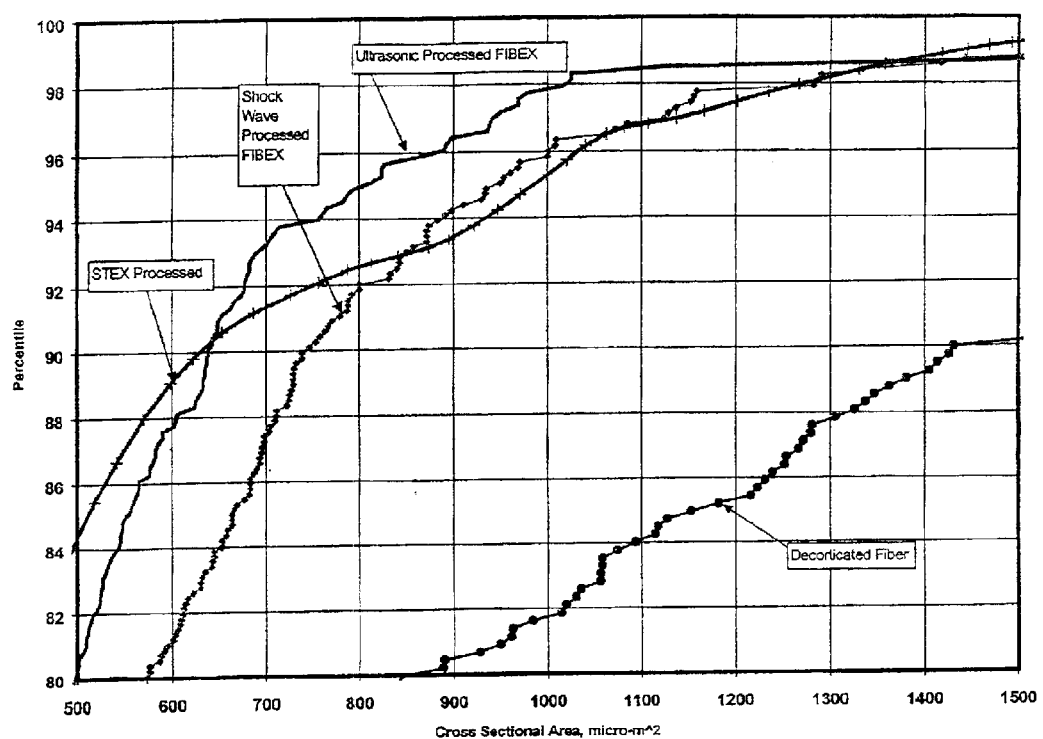
Figure 4c Enlarged View of Figure 4b

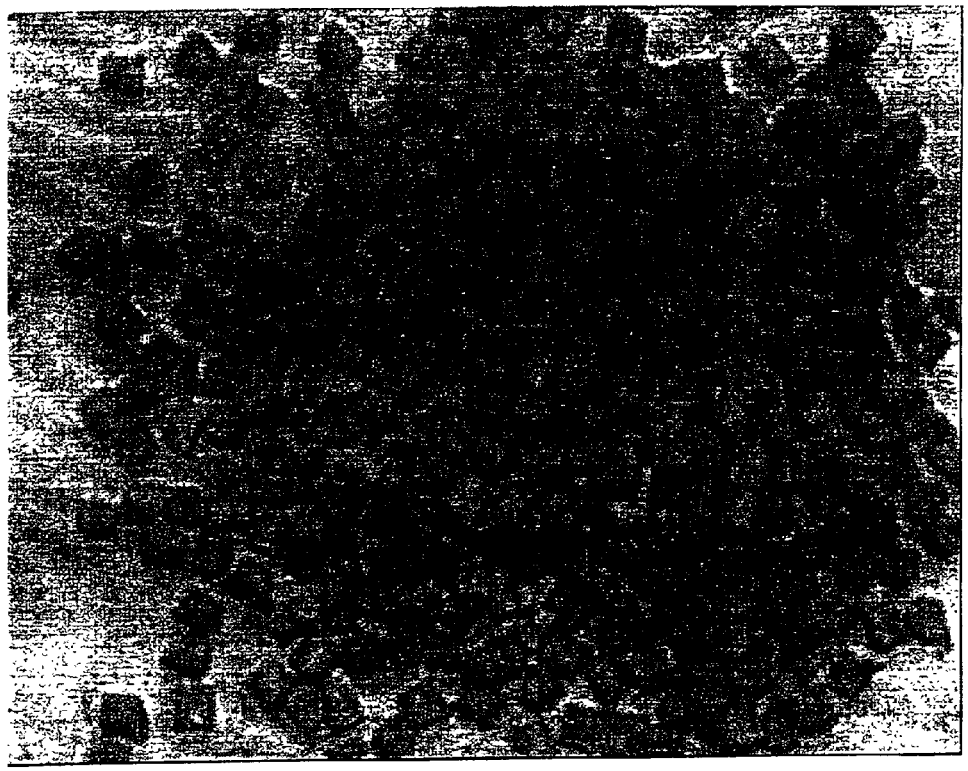
Figure 5 Photograph of 30% by weight FIBEX™ reinforced polypropylene pellets

Figure 6 Injection molded specimens with FIBEX™ (40% by weight) reinforced polypropylene pellets showing smooth surface WITHOUT any 'balling-up' of fibers.
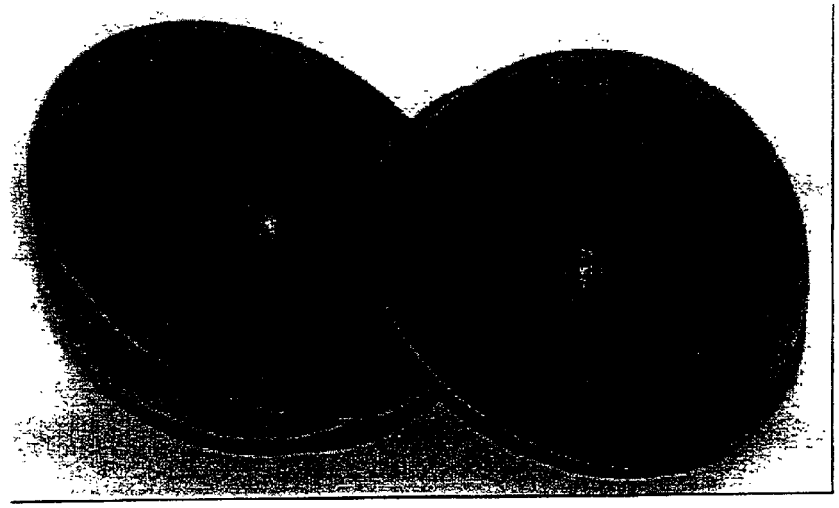
Figure 7 Injection molded parts (hemispherical shells in a double cavity mold) at 30% FIBEX™ loading showing even dispersion of fiber in resin with a smooth surface

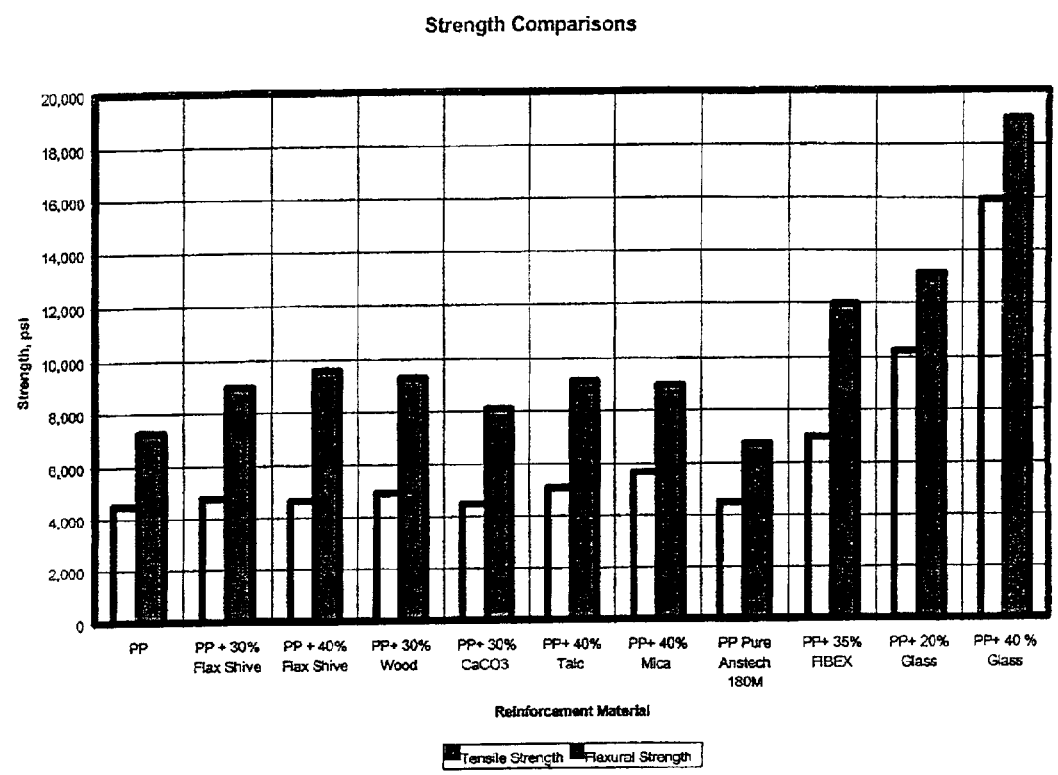
Figure 8 Comparison of strength of FIBEX™ reinforced polypropylene with other reinforcements and fillers from the literature

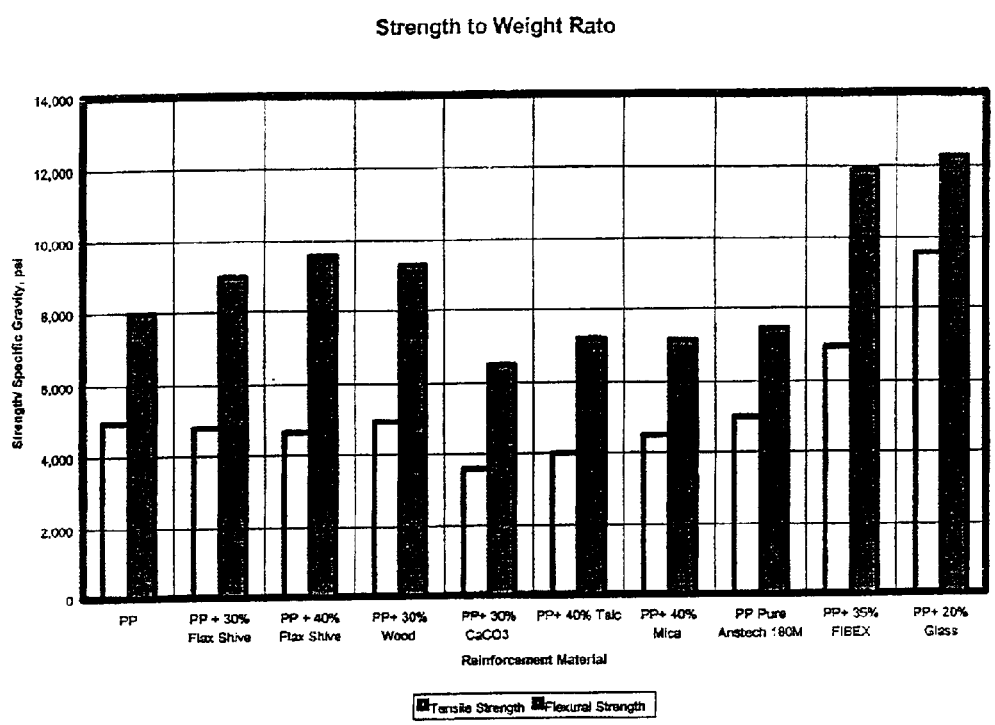
Figure 9 Comparison of strength (a) and stiffness (b) to weight ratio of FIBEX™ reinforced polypropylene with other reinforcements and fillers from the literature

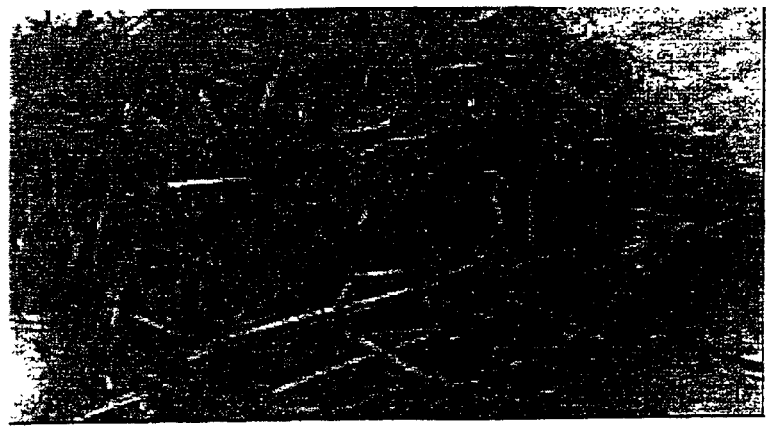
Figure 10a Photograph of decorticated bast fiber prior to ultrasonic processing
Figure 10b Photograph of FIBEX™ after ultrasonic processing

FIBRILLATED BAST FIBERS AS REINFORCEMENT FOR POLYMERIC COMPOSITES

This application claims the benefit of provisional 60/281,964 filed on Apr. 6, 2001.

BACKGROUND OF THE INVENTION

1. Field of the Invention

The present invention relates to decorticated and fibrillated bast fibers as reinforcement for polymeric, thermoplastic, and thermoset composites.

2. Description of the Related Art

A polymer matrix composite (PMC) is defined as a matrix of plastic resins reinforced by fibers or other reinforcements with a discernible aspect ratio of length to diameter. Materials used to reinforce resins to provide superior strength, stiffness, impact resistance relative to weight include primarily glass, carbon, boron, aramids and cellulosic, or organic fibers. The fibrous reinforcements with a relatively high aspect ratios are distinctly different from fillers which are primarily in particulate or powdered form. Fillers for plastics include calcium carbonate, talc, mica, wollastonite, fly ash and other inorganic or organic compounds. The polymers may be either thermoset or thermoplastic resins and include polyesters, vinyl esters, epoxies, polyvinylchloride (PVC) and polyolefins such as polypropylene (PP) and low/medium/ high density polyethylene (LDPE, MDPE, HDPE).

The superior properties of the reinforced plastics makes them particularly useful for load bearing and structural applications. Polyolefins currently account for approximately 11.92 billion pounds of material, over 51% of the potential market. The total global annual consumption of reinforced plastics surpassed 23 billion pounds in 1999, and continues to grow at an overall rate of 5.4% per year. While both continuous and short fibers are used as reinforcement, a particular need is evident for the use of short lignocellulosic bast fibers such as flax, kenaf, jute, ramie, sisal, and hemp.

Natural bast fibers such as hemp, jute, flax, kenaf and sisal, have been used for tens of thousands of years to make paper, textiles, cordage and other products essential to human existence. Recently, there has been a resurgent interest in utilizing agricultural products as feedstock for industrial application. This trend is driven by several key factors, among them: 1) Reduction of dependence upon forest products and foreign petroleum; 2) Need to find alternatives to farm subsidies to support rural communities; 3) Elimination of air pollution caused by burning waste straw; 4) Desire to utilize more sustainable, less toxic natural resources.

In 1996, German environmental legislation mandated that cars must be able to be recycled. While the European automobile manufacturers found that they could successfully recover and recycle steel and rubber materials, they could do little with the glass fiber reinforced plastics used throughout vehicle interiors.

By combining natural fibers with polypropylene fibers in to non-woven mat products, then heating and pressing these mats into three-dimensional shapes, manufacturers could effectively produce interior trim components such as door panels, seat backs, package trays and instrument panels. Automobile manufacturers found that these natural fiber composites achieved a number of important benefits, including improved impact strength, significant weight reduction, lower manufacturing costs, greater dimensional stability, better acoustical performance, reduced waste generation, ability to recycle products, and safer work environments.

Flax (*Linum usitatissimum* L.) is grown as a commercial crop in Canada and the U.S. and harvested primarily for oil seed. Flax oil yields high quality solvents and lubricants such as linseed oil, and building materials such as linoleum flooring. Once harvested, the flax stalk becomes waste field straw. Because this straw cannot typically be plowed under, it poses a significant waste management problem for growers. The traditional disposal method is to burn it in the field, but this practice generates significant environmental and human health problems. Every 100,000 acres of flax straw burned produces the equivalent annual emissions of approximately 43,000 cars, or over 2 million pounds of green house gasses.

The traditional process for preparing the straw for reinforcement involves decortication. During decortication, the 'shive' core from the plant is removed and the fibers from the 'bark' of the plant is extracted. These long fibers, typically 4 to 6 inches in length are then used to prepare a non-woven, or needle punched mat with other polymeric fibers for use in compression molded parts.

For many years there has been a significant effort in research laboratories in North America, Europe and Asia to develop process technologies to effectively exploit the reinforcement properties of bast fibers in plastics. While a number of technologies have worked on a laboratory scale, the only commercial application of bast fibers has been in non-woven mats in compression molded automotive parts as described above. Since compression molding constitutes only about 20% of the installed base, the focus of research efforts has been to develop other methods to address a much larger market sector.

Every attempt in the past has resulted in problems similar to that quoted in U.S. Pat. No. 6,114,416 where the bast decorticated fiber due to its low bulk density 'balls up'. Other terms used to describe the phenomenon is 'clumping', 'matting' or 'hanging together' of the fibers during compounding. The result of this has been an uneven and inconsistent distribution of the fiber in the resin matrix in the final product with areas that are resin rich and those that resin starved (fiber rich). Also, the surface finish of the parts is not smooth due to the effect of 'clumping. Additionally, as reported in U.S. Pat. No. 6,114,416, the percent of bast fiber by weight that may be added to the resin is also very limited, typically much less than 10% by weight beyond which compounding, and molding of the composite specimen is not possible.

A prior method of fibrillation of bast fibers includes steam explosion. The STEX (steam explosion) process uses hydrolysis at elevated temperatures as its main method of removing unwanted constituents of flax, especially pectins, hemicellulose, and lignin. The processes described in the technical literature generally soak the flax with aqueous solutions prior to steam explosion. The thoroughly wet flax has adherent water, the acidity of which has been adjusted to the alkaline side in an attempt to reduce the degradation of the cellulose. A typical successful STEX process exposes the flax to 200 C. temperatures for 10 to 20 minutes. After quick release of the pressure, the steam-exploded flax usually is washed with an alkaline solution.

The effect of this procedure leads to a product that is high in cellulose percentage because most of the other polymers have been removed. Nevertheless, the composition of the cellulose has changed due to partial hydrolysis of this glucose polymer. The key indication of this damage is the degree of polymerization (DP) of the cellulose. Flax cellulose has DP of 1000 to 2000 glucose units. The reduction in DP depends on the severity of the conditions under which the STEX takes place. If the severity exceeds 3.0, the degradation is so drastic that the product is worthless. The most sophisticated STEX processes have a severity of about 2.7 which still provides a strong, useful product. Nevertheless, about 20% to 50% of the DP will be lost to associated hydrolytic action.

SUMMARY OF THE INVENTION

Through a combination of special processes, decorticated bast fibers are converted to a unique fibrillated state of matter, herein termed Fibex (FIBEX™), that overcomes all the difficulties in the stated above during compounding and molding. Fibex fibrillated bast fibers, also have superior characteristics over prior bast fibers.

While waste flax straw has been used as for demonstration of the invention, the general methodology covers all bast fiber materials listed above including flax, hemp, kenaf, jute, sisal, ramie, and similar bast fibers and lignocellulosic fibers. FIG. 1 shows the relative strengths of various pure bast fibers. As shown, flax is one of the strongest of the natural fibers.

The invention, in one form, comprises a fibrillated bast fiber composition including a decorticated bast fibers of which at least approximately 90% of the fibers have a cross-sectional area of less than approximately 700 micrometers squared.

The invention, in another, comprises form a fibrillated bast fiber composition including decorticated bast fibers which have been fibrillated without auto-hydrolysis, such that the fibrillated fibers have a molecular weight at least 75% of the molecular weight of the pre-fibrillated decorticated fibers.

The invention, in yet another form, comprises a fibrillated bast fiber composition including decorticated bast fibers which have been fibrillated without auto-hydrolysis such that the fibrillated fibers have a molecular weight at least 90% of the molecular weight of the pre-fibrillated decorticated fibers.

The invention, in still another form, is a process of forming a bast fiber composition comprising providing decorticated bast fibers; fibrillating the decorticated bast fibers utilizing mechanical impact; and admixing the fibrillated bast fibers with a polymeric resin. The fibrillating step, in the preferred form comprises the application of ultrasonic energy to the decorticated bast fibers. The application of ultrasonic energy in one form of the invention is conducted through liquid to said decorticated bast fibers.

One advantage of the present invention is having a much finer fiber that conventional decorticated materials as seen the scanning electron micrographs, FIGS. 2a and 2b.

Another advantage of the present invention is that significantly greater surface area for bonding with the resin for the same quantity as compared to decorticated materials, as shown in FIG. 4.

Another advantage of the present invention is that effective wetting and dispersion during compounding with polymeric resins up to 50% by weight loading in the polymers.

Yet another advantage of the present invention is the availability, due to the prevention of clumping, of development of standard compounded pellets for ease of storage, transportation and handling.

Still another advantage of the present invention is the injection molding of specimens without any problems with 'clumping' or balling up of fibers. Further, injection molding of parts using conventional equipment may be utilized and is now possible.

Yet another advantage of the present invention is a significant increases in stiffness and strength of the formed composites. Significant benefits in strength and stiffness to weight ratios approaching those of glass reinforced materials have been shown.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a graph indicating the strength of various natural fibers showing flax fiber to be the strongest;

FIG. 2 is a Scanning Electron Micrograph of (a) decorticated flax fiber (25×) and (b) Fibex fiber of one form of the invention (100×);

FIG. 3 is typical surface of molded specimen with decorticated fiber demonstrating 'clumping' or 'balling up' of fiber during compounding and molding (prior art);

FIG. 4 is a cross sectional area comparison of decorticated fiber and the Fibex material of one form of the invention;

FIG. 5 is a photograph of one form of Fibex reinforced polypropylene pellets;

FIG. 6 is a photograph of injection molded specimens with Fibex (40% by weight) reinforced polypropylene pellets of showing smooth surface without any 'balling up' of fibers;

FIG. 7 is a photo of injection molded part (hemispherical shell from a double cavity mold) at 30% Fibex fiber loading showing even dispersion of fiber in invention composite resin;

FIG. 8 is a graph showing a comparison of strength (a) and stiffness (b) of Fibex reinforced polypropylene with other reinforcements and fillers;

FIG. 9 is a graph showing a comparison of strength (a) and stiffness (b) to weight ratio of Fibex reinforced polypropylene with other reinforcements and fillers; and FIG. 10a and FIG. 10b are photographs of fibers (a) before and (b) after ultrasonic processing.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Unlike other fiber processing technologies applied to bast fibers such as steam explosion (STEX), Fibex does not rely upon the use of solvents, chemicals, microbes or enzymes. As a result, there is no chemical residue. Products made with Fibex will not off-gas volatile organic compounds (VOC's) or emit strong odors commonly associated with flax. The mechanism by which Fibex is made differs fundamentally from the mechanism of the STEX process that is now practiced in Europe. The result is therefore a different composition of matter. Fibex and STEX cellulosic fibers are different compositions of matter when made from the same sample of flax. The compositional differences arise from differences in their manufacturing procedures.

During the STEX process, pretreatment is necessary in addition to STEX. The pretreatments use one or more of the following: alkaline solutions, surfactants, metal salts, complexing agents, and acid buffers. All of them act in aqueous environments and are intended to hydrolyze and/or dissolve hemicellulose and pectins without much damage to the cellulose polymer in the bast fiber.

The STEX process is an autohydrolysis process aimed at depolymerizing carbohydrates other than cellulose. In general, the hydrolysis cleaves the polymer chain at the hemiacetal functional groups. It involves cleavage of carbon-to-oxygen bonds. It is operated in a temperature/pH range known to leave cellulose mostly undisturbed while attacking hemicellulose, lignin, and pectins. That is, the temperature is well under the Tg of cellulose and well above the Tg of the other polymers. The end of the process involves release of pressure in which 10 bar to 15 bar pressure is reduced to one bar, suddenly. This mechanical action helps to free the partly depolymerized and solubilized substances from the cellulose fiber.

In contrast, Fibex processing is a primarily mechanical technology in which the unwanted flax constituents are abraded or scraped from the underlying cellulose. Although water is not rigorously excluded, no water or alkali is necessarily added for Fibex processing. The process does not feature hydrolysis. Brief periods of intensive heating occur as part of the mechanical action. There may be some chemical action under these conditions. The mechanical forces may press some of the non cellulosic material into the cellulose fibers to form thin coatings or even graft polymers. Depending on the Fibex processing conditions that are selected, there may be some decrease in DP of the order of 5% to 15% due to fracture of the polymer chains which is a radical chemical reaction, not a hydrolytic reaction.

It follows from the above description that the differences in composition of these two products (STEX and Fibex) can be determined by standard analytical methods. Fibex fibers will have a lower percentage of cellulose that STEX fibers will have. Fibex cellulose will have a distinctly higher DP than STEX fibers will have. Detailed analysis of samples of the two types of fibers will show differences in the chemical compositions of the residual films that cling to the cellulose framework.

In addition to these differences in composition, differences in the polymer morphology can be detected. STEX fibers are likely to show a higher percentage of crystallinity in its cellulose than is found with Fibex. The prolonged heating at elevated temperature and hydrolysis reactions provide the opportunity for the STEX product to move toward the most thermodynamically stable (crystalline) form. Fibex processing does not provide this opportunity due to its quick mechanical action. Based on such differences, Fibex and STEX products are distinctly different compositions of matter.

The present invention of fibrillated bast type fibers, Fibex production, uses any number of processes, all of which are likely to involve mechanical or shock waves. The preferred process, an ultrasonic process, is one possible method of dispersing the fiber, uses a burst of energy from transducers that operate in an aqueous, air, fluid, or other environment, in which cavitation phenomena are clearly present. The implosion of the tiny bubbles or other particles abrade the hemicellulose and pectin sheath off of the raw cellulose bast fiber.

EXAMPLE

An experiment was designed to apply ultrasonic energy to selectively break the weaker inter-fiber bonds of flax bast without breaking the main fibers by appropriate levels and modalities of ultrasonic energy.

The key ultrasonic processing parameters are:

Ultrasonic vibration amplitude at the active face of the applicator;

Ultrasonic horn design;

Ultrasonic frequency;

Active surface area of the horn;

Treatment time;

Fiber-to-water weight ratio;

Initial state or condition of the decorticated fibers

Total treatment volume of the water;

Differing Water treatments (e.g., "alkaline water, 5-$\mu$m filtered water, alkaline 5-$\mu$m filtered water, tap water etc."); and Post processing of the fibers (e.g., air drying at room temperature).

A Dukane Corporation 20-kHz ultrasonic power supply with automatic power control was used for all tests. The vibration amplitude of the converter was 20 $\mu$m peak-to-peak (pp). Since the power supply is power controlled, this vibration amplitude is a constant at all power settings. A booster with a mechanical gain or amplification of 2.5 was used to amplify the vibration to 50-$\mu$m pp. Several types of "horns" or mechanical resonant amplifiers were tried for adequate mixing as well as amplification and control of the vibration amplitude. Visual observations were used for all feedback on performance. An axis-symmetric ultrasonic horn with a gain of 2 and an active surface diameter of 1 inch, was found to perform the best and was used for all subsequent tests. Therefore, the net amplitude at the active surface is 100-$\mu$m pp.

Several trials indicated that a water-to-fiber weight ratio of 400 appears to work the best, when the total weight of water was 200 gm. For each experiment carefully weighed 0.5 gm of dry fiber were added to 200 gm of 5-$\mu$m filtered water. Treatment times of 5, 10, 15, 20, 30 and 60 seconds at power settings of 5, 15 and 25 on the ultrasonic generator were utilized. For commercial success, the objective was to investigate good performance with minimum power and time. This led to the selection of treatment time of 20 seconds at the minimum power setting of 5. At these settings, decorticated fibers were place in the ultrasonic field fibrillated to yield sufficient quantities of Fibex for characterization. FIGS. 10a and 10b are photographs of the fibers before and after treatment. The fibers were subsequently air dried prior to further evaluation.

The trials indicated that:

1. Ultrasonic fibrillation of decorticated bast fibers in the water medium is very effective;

2. Commercially available 20-kHz, 1-kW ultrasonic power supply was adequate;

3. The treatment time of 20 seconds was sufficient at the minimum power setting value of 5.

The fibrillated Fibex material from any of the mechanical wave processing methods can be used to compound with polymers using appropriate coupling agents to promote adhesion between the fibers and the resin. In the first case the Fibex was compounded with and 18 melt flow index (MFI) polypropylene homopolymer (Aristech 180M) using a standard roll mill at 420 F. A maleated polypropylene (MAPP Polybond 3200) was used as the coupling agent. The compound consisted of 30 to 40% by weight Fibex and 1 to 4% by weight MAPP with the balance being the PP homopolymer. The resulting compound was injection molded into standard specimens for evaluating density (per ASTM 638), tensile properties (per ASTM 6), flexural properties, and Izod Impact. The results obtained using Fibex as compared to other data from the literature for flax shives as well as other fillers and reinforcements is shown in FIGS. 8 and 9. As seen in FIG. 8, both the tensile and flexural strength of the new Fibex fibrillated fiber and compound is far superior to all other reinforcements and approach those of glass fibers in PP resins. The results are even more pronounced when compared on a strength to weight ratio basis in FIG. 9.

The method of formulating Fibex fibers and Fibex composites includes:

1. Decortication of the bast fibers from raw materials;
2. Fibrillation, decorticated bast fibers with mechanical impact forces; and
3. In the preferred form, application of sufficient ultrasonic energy to remove the cellulose polymers from the other constituents. The ultrasonic process may occur in different regimes of power, frequency, container designs, and treatment time. The method then includes taking the fibrillated fibers and compounding same with polymeric thermoplastics (such as, PP, HDPE, LDPE, PVC, Nylon, SAN, Polyurethanes, Polystyrenes) or thermoset (polyesters, vinyl esters, epoxies, etc.), in particular resins that have processing temperatures below 325° C. The method of creation further includes the use of MAPP based coupling agents, or alternate coupling agents between the Fibex fibrillated fibers and the polymeric resins, such as acrylic acid coupling agents, silanes, aminosilanes, and isocynates. Such use of the above coupling agents increase the strength of the resin composition.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fibrillated bast fiber composition comprising:

decorticated bast fibers of which at least approximately 90% of the fibers have a cross-sectional area of less than approximately 700 Micrometers squared.

2. A fibrillated bast fiber composition comprising:

decorticated bast fibers of which at least approximately 93% of the fibers have a cross-sectional area of less than approximately 875 Micrometers squared.

* * * * *